(12) United States Patent
Wang et al.

(10) Patent No.: US 10,860,636 B2
(45) Date of Patent: Dec. 8, 2020

(54) METHOD AND APPARATUS FOR SEARCHING CARTOON

(71) Applicant: BAIDU ONLINE NETWORK TECHNOLOGY (BEIJING) CO., LTD., Beijing (CN)

(72) Inventors: Lu Wang, Beijing (CN); Quan Qing, Beijing (CN); Ke Du, Beijing (CN); Langbo Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 480 days.

(21) Appl. No.: 15/316,420

(22) PCT Filed: Jul. 13, 2015

(86) PCT No.: PCT/CN2015/083900
§ 371 (c)(1),
(2) Date: Dec. 7, 2016

(87) PCT Pub. No.: WO2016/134576
PCT Pub. Date: Sep. 1, 2016

(65) Prior Publication Data
US 2017/0192966 A1 Jul. 6, 2017

(30) Foreign Application Priority Data
Feb. 26, 2015 (CN) .......................... 2015 1 0088172

(51) Int. Cl.
*G06F 16/40* (2019.01)
*G06F 16/90* (2019.01)
(Continued)

(52) U.S. Cl.
CPC ............ *G06F 16/438* (2019.01); *G06F 16/58* (2019.01); *G06F 16/9577* (2019.01)

(58) Field of Classification Search
CPC .... G06F 16/438; G06F 16/58; G06F 16/9577; G06F 16/9535
See application file for complete search history.

(56) References Cited

U.S. PATENT DOCUMENTS

2009/0252435 A1\* 10/2009 Wen ................... G06K 9/00228
382/284
2012/0120097 A1 5/2012 Sun et al.
(Continued)

FOREIGN PATENT DOCUMENTS

CN 102736827 A 10/2012
CN 103561161 A 2/2014
(Continued)

OTHER PUBLICATIONS

Meghan Blalock, "Cartoon Celebs: The 10 Best Stars to Ever Make Animated Appearances," Nov. 11, 2013 [retrieved on Feb. 3, 2020]. Retrieved from the Internet: <URL: https://web.archive.org/web/20131111215555/http://stylecaster.com/cartoon-celebrities/>. (Year: 2013).*

(Continued)

*Primary Examiner* — Kristopher Andersen
(74) *Attorney, Agent, or Firm* — Hodgson Russ LLP

(57) ABSTRACT

The present disclosure provides a method and an apparatus for searching a cartoon. The method includes: S1, receiving query information input by a user; S2, acquiring cartoon information related to the query information; and S3, providing a searching result page, and displaying the cartoon information in the searching result page in a preset form. With the method and apparatus provided by the present disclosure, the user may browse relevant cartoons through searching without needing to search and browse on the
(Continued)

social network or click the natural result to enter a website for browsing, thereby better satisfying the user's cartoon searching requirement.

17 Claims, 6 Drawing Sheets

(51) Int. Cl.
*G06F 16/438* (2019.01)
*G06F 16/957* (2019.01)
*G06F 16/58* (2019.01)
*G06F 16/50* (2019.01)

(56) References Cited

U.S. PATENT DOCUMENTS

| | | | |
|---|---|---|---|
| 2012/0131463 A1* | 5/2012 | Lefler | G06F 3/0483 715/730 |
| 2012/0239638 A1 | 9/2012 | Bennett | |
| 2016/0021153 A1* | 1/2016 | Hull | G06F 16/29 715/753 |

FOREIGN PATENT DOCUMENTS

| | | | |
|---|---|---|---|
| CN | 103744909 | * | 4/2014 |
| CN | 103744909 A | | 4/2014 |
| CN | 103761315 A | | 4/2014 |
| EP | 2557515 | | 2/2013 |
| JP | 2007533209 | | 11/2007 |
| JP | 2009098829 | | 5/2009 |
| JP | 2012079155 | | 4/2012 |
| JP | 2012114525 | | 6/2012 |
| JP | 2014219767 | | 11/2014 |
| KR | 20130000723 A | | 1/2013 |

OTHER PUBLICATIONS

First Office Action, Application No. 201510088172.3, The State Intellectual Property Office of People's Republic of China, dated Nov. 30, 2016.
ISA/CN, International Search Report for PCT/CN2015/083900 dated Sep. 28, 2015.
"Skilled in Using YouTube on Ipad! These are the Necessary Skills!" iPad, vol. 763, Dec. 16, 2014, p. 52-53.
EPO, Office Action for EP Application No. 15883014, dated Jul. 11, 2018.
JPO, Office Action for JP Application No. 2017505153, dated Dec. 12, 2017.

* cited by examiner dialog box for inputting information by the user

METHOD AND APPARATUS FOR SEARCHING CARTOON

CROSS REFERENCE TO RELATED APPLICATION

This application claims priority to and benefits of Chinese Patent Application No. 201510088172.3, filed with State Intellectual Property Office on Feb. 26, 2015, which is entitled as "method and apparatus for searching cartoon" and owed by BAIDU ONLINE NETWORK TECHNOLOGY (BEIJING) CO., LTD., the entire content of which is incorporated herein by reference.

FIELD

The present disclosure generally relates to the searching technology field, and more particularly, to a method and an apparatus for searching a cartoon.

BACKGROUND

The search engine is a system which collects information from Internet based on certain strategies and by using specific computer programs, and provides a user with search services after organizing and processing the information, and shows information relevant to user's search to the user.

With the development of search technology and user demand, many users expect to get a variety of information via the search engine. For example, when the long-tail query, such as "star+cartoon book", is searched, it is expected to show stories between stars and fans, and to be a page view, and to support sharing on social network and the like functions.

However, when the current search engine performs the search such as "star name+cartoon book", "star name+story" and the like, the search result page mostly has natural results, and the user needs to click into the site to browse. The star-related cartoon stories popular in social network cannot be found. When the user consciously looks for "star name+cartoon book", the relevant story cannot be seen.

Thus, when the current search engine performs the search, such as "star name+story", most of the search results have poor relevance, and cannot accurately meet user's cartoon search needs.

SUMMARY

The present disclosure aims to solve at least one of the above problems to some extent.

Accordingly, a first objective of the present disclosure is to provide a method for searching a cartoon, which may satisfy user's cartoon search needs better.

A second objective of the present disclosure is to provide an apparatus for searching a cartoon.

A third objective of the present disclosure is to provide a storage medium.

A fourth objective of the present disclosure is to provide a search engine.

In order to achieve above objectives, embodiments of a first aspect of the present disclosure provide a method for searching a cartoon. The method includes: S1, receiving query information input by a user; S2, acquiring cartoon information related to the query information; and S3, providing a searching result page, and displaying the cartoon information in the searching result page in a preset form.

With the above method for searching a cartoon, by receiving the query information input by the user, and acquiring the cartoon information related to the query information and displaying the cartoon information in the searching result page in the preset form, the user may browse relevant cartoons through searching without needing to search and browse on the social network or click the natural result to enter a website for browsing, thereby better satisfying the user's cartoon searching requirement.

In order to achieve above objectives, embodiments of a second aspect of the present disclosure provide an apparatus for searching a cartoon. The apparatus includes: a receiving module, configured to receive query information input by a user; an acquiring module, configured to acquire cartoon information related to the query information; and a displaying module, configured to provide a searching result page, and to display the cartoon information in the searching result page in a preset form.

With the above apparatus for searching a cartoon, by receiving the query information input by the user via the receiving module, and acquiring the cartoon information related to the query information via the acquiring module and displaying the cartoon information in the searching result page in the preset form via the displaying module, the user may browse relevant cartoons through searching without needing to search and browse on the social network or click the natural result to enter a website for browsing, thereby better satisfying the user's cartoon searching requirement.

In order to achieve above objectives, embodiments of a third aspect of the present disclosure provide a storage medium having stored therein applications configured to perform the method for searching a cartoon according to embodiments of the first aspect of the present disclosure.

In order to achieve above objectives, embodiments of a fourth aspect of the present disclosure provide a search engine. The search engine includes: one or more processors; a memory; one or more modules stored in the memory, and executed by the one or more processors to perform following acts: S1, receiving query information input by a user; S2, acquiring cartoon information related to the query information; and S3, providing a searching result page, and displaying the cartoon information in the searching result page in a preset form.

DETAILED DESCRIPTION

Reference will now be made in detail to embodiments of the present disclosure, examples of which are illustrated in the accompanying drawings. The following description refers to the accompanying drawings in which the same numbers in different drawings represent the same or similar elements unless otherwise represented. The embodiments described herein according to drawings are explanatory and illustrative, not construed to limit the present disclosure.

A method and an apparatus for searching a cartoon according to embodiments of the present disclosure will be described with reference to accompanying drawings as follows.

Figure 1:
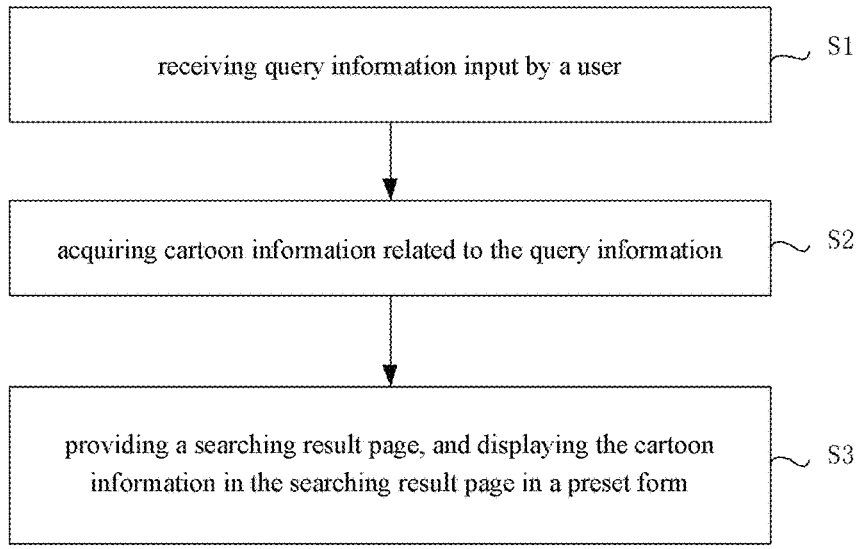
FIG. 1 is a flow chart showing a method for searching a cartoon according to an embodiment of the present disclosure.

FIG. 1 is a flow chart showing a method for searching a cartoon according to an embodiment of the present disclosure.

As shown in FIG. 1, the method includes followings.

In S1, query information input by a user is received.

In the embodiment, when the user wants to acquire some information, he may input the query information in a search box. For example, when the user expects to get cartoon stories of Liu Shishi (a Chinese actress), he may input the query information of "Liu Shishi cartoon book" in the search box.

In S2, cartoon information related to the query information is acquired.

In the embodiment, before the search engine performs S2, a correspondence between queries and related cartoon information has been stored. Thus, the search engine may acquire the related cartoon information based on the current query and the above correspondence.

Specifically, the search engine first determines whether the query information satisfies a preset condition, in which the preset condition here may be whether the query information includes a preset keyword, such as cartoon book, story. If the query information satisfies the preset condition, the search engine extracts the current query from the query information, for example, the current query "Liu Shishi" is extracted from "Liu Shishi cartoon book"; and the search engine acquires cartoon information related to the current query according to the current query and the pre-stored correspondence between queries and related cartoon information, for example, a plurality of cartoon pictures.

In S3, a searching result page is provided, and the cartoon information is displayed in the searching result page in a preset form.

In the embodiment, the cartoon information may be displayed in the searching result page in a form of banner. The banner here is relative to the column in the related art. The column refers to that a light gray vertical bar is used as a separation to divide the searching result displaying region into a left region and a right region. The banner eliminates this separation, such that a width of the displaying region is same as a width of a browser page of a current terminal. This displaying form is more intense, and may attract the attention of the user.

Figure 2:
FIG. 2 is a schematic diagram showing a searching result according to an embodiment of the present disclosure.

In addition, in order to facilitate the user to clearly know the main body corresponding to the current cartoon story, head portrait information related to the query information may be acquired when performing S2 in the embodiment. For example, the head portrait of Liu Shishi is acquired, and the head portrait of Liu Shishi and her cartoon picture may be displayed in the form of the banner, as show in FIG. 2. It can be seen from FIG. 2 that, the main body at the left side in the searching result page is the cartoon picture, and the right side shows the actress's head portrait. It should to be noted that, the use of related pictures and portraits was confirmed and authorized by the actress and the painter. The stories at the left side are related to the actress and are Q version of cartoons by using the actress as the prototype. Compelling stories happened on the actress since her debut may be told from the aspect of fans, and are vividly expressed in the form of cartoon.

Specifically, S3 may include: displaying the cartoon picture, for example, the first cartoon picture, in the cartoon information in the form of banner.

Figure 3:
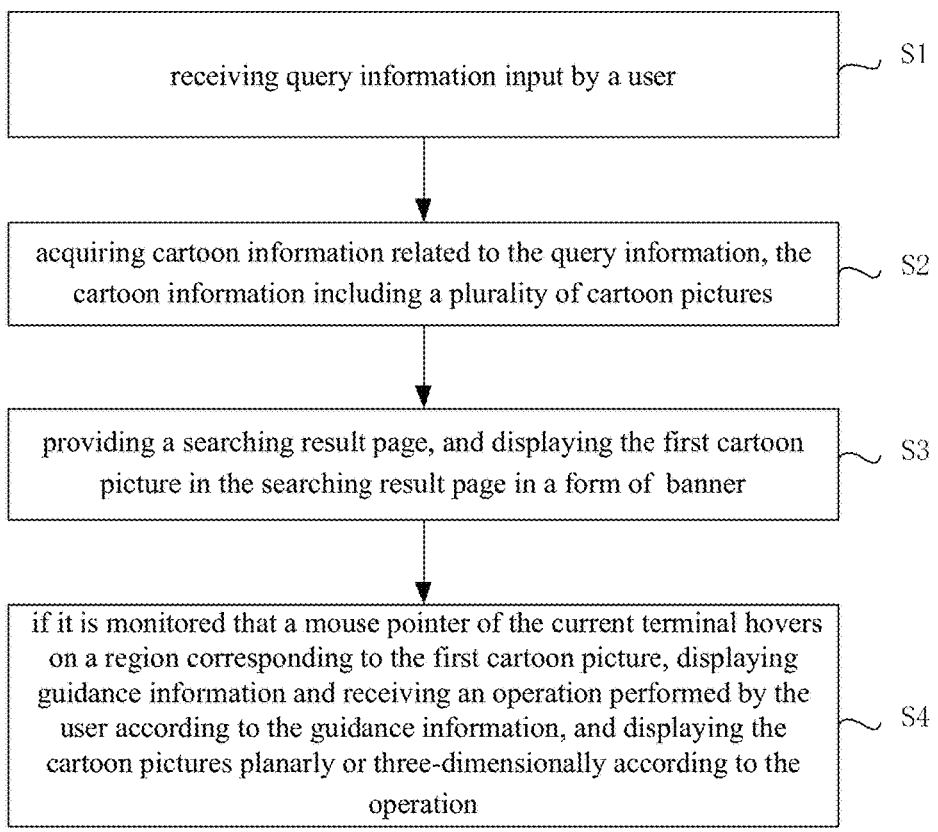
FIG. 3 is a flow chart showing a method for searching a cartoon according to another embodiment of the present disclosure.

In addition, as shown in FIG. 3, in order to allow the user to browse the above cartoon, after the first cartoon picture in the cartoon information is displayed in the form of banner, the method further includes followings.

In S4, if it is monitored that a mouse pointer of the current terminal hovers on a region corresponding to the first cartoon picture, guidance information is displayed and an operation performed by the user according to the guidance information is received, and the cartoon pictures are displayed planarly or three-dimensionally according to the operation.

Figure 4:
FIG. 4 is a schematic diagram showing a picture turning according to an embodiment of the present disclosure.

Specifically, when the user puts the mouse within the region of the first cartoon picture, an arrow to the right may be formed automatically in this region, so as to guide the user to click and browse downwards. When the user clicks on the arrow to the right, he may browse the cartoon pictures downwards. The animation effect when browsing may be the advanced 3D page turning effect, as shown in FIG. 4. Different from the general planar page turning effect, the 3D page turning effect is three-dimensional and has dimensional feeling and is close to page turning in real life.

It should to be noted that, the above S4 is only an example implementation, and may be replaced by other implementations, for example, a triggering operation of the user on the first cartoon picture is received and the cartoon pictures are displayed planarly or three-dimensionally according to the triggering operation. Specifically, the double click operation by the user on the first cartoon picture is received, and the above cartoon pictures may be displayed planarly or three-dimensionally according to the double click operation.

Figure 5:
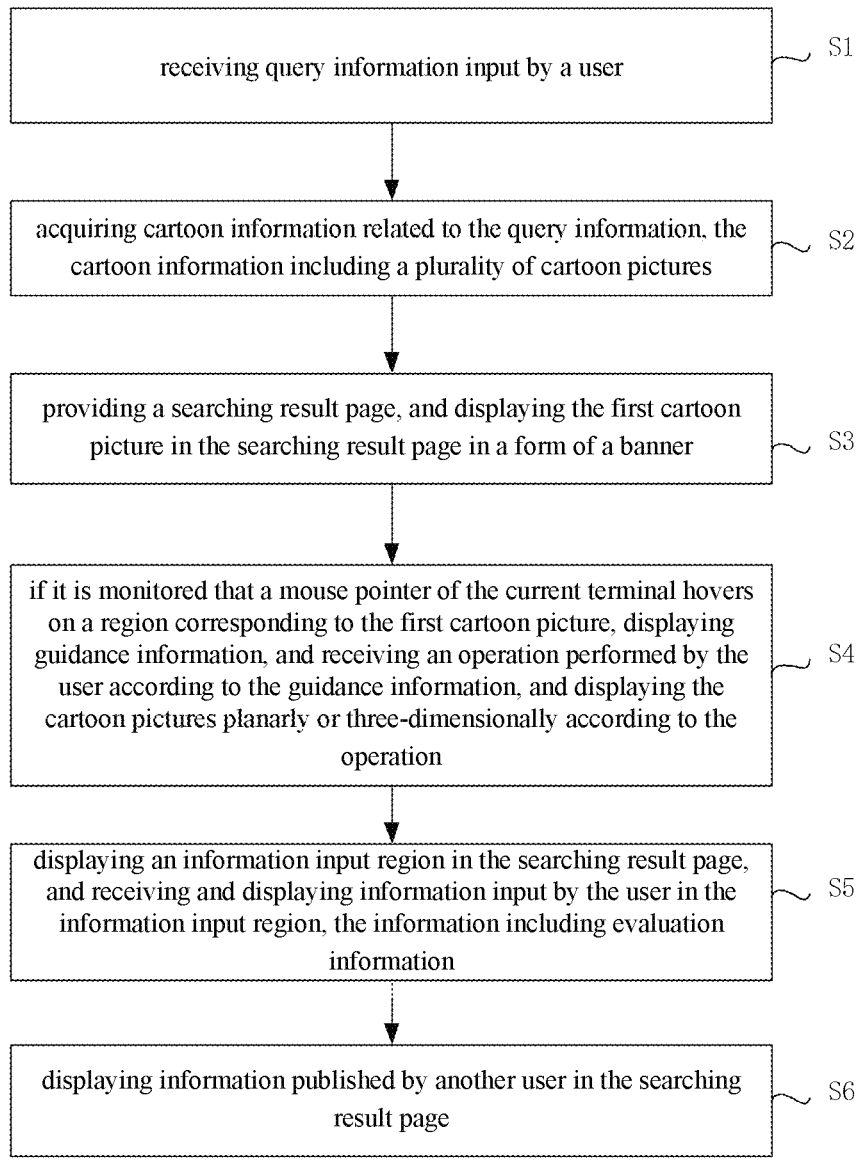
FIG. 5 is a flow chart showing a method for searching a cartoon according to still another embodiment of the present disclosure.

Further, in order to make it convenient for the user to input reading experience and publish comments during reading, the method may also include followings, as shown in FIG. 5.

In S5, an information input region is displayed in the searching result page, and information input by the user in the information input region is received and displayed. The information includes evaluation information.

In S6, information published by another user is displayed in the searching result page.

Figure 6:
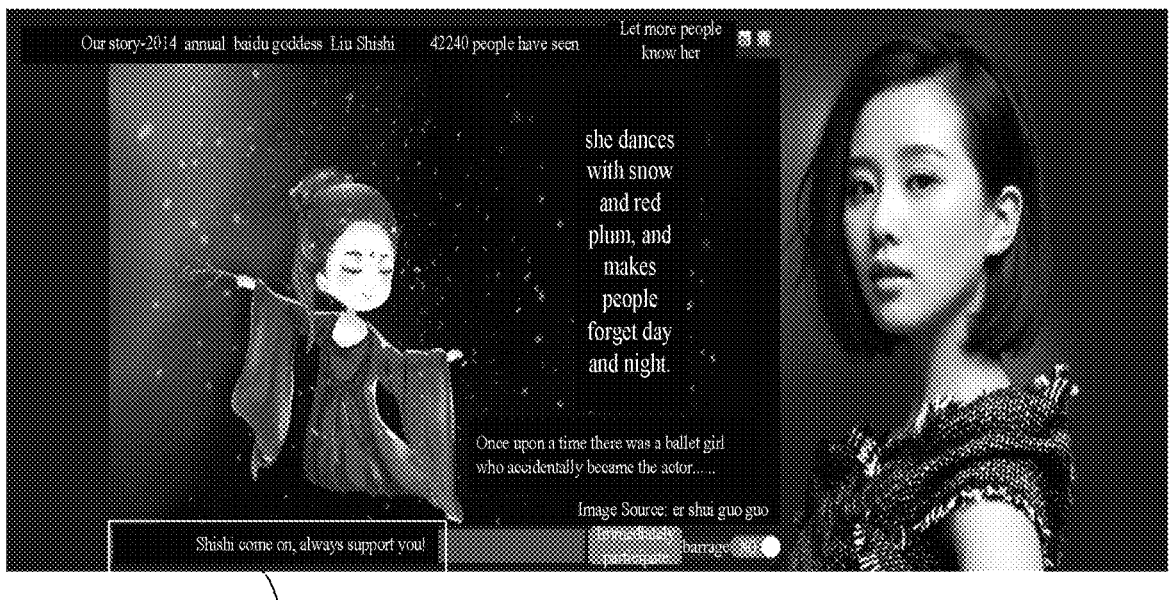
FIG. 6 is a first schematic diagram showing a page displaying evaluation information according to an embodiment of the present disclosure.
Figure 7:
FIG. 7 is a second schematic diagram showing a page displaying evaluation information according to an embodiment of the present disclosure.

As shown in FIG. 6, during the reading, the user may input the reading experience and publish comments in the information input region under the cartoon, such as a dialog box, and then the comment may be displayed in the cartoon picture region timely, meanwhile other people's comments may also be displayed in this region. As shown in FIG. 7, the user may see and respond to other people's comments, thereby meeting needs of communicating with people and sharing reading experience.

Figure 8:
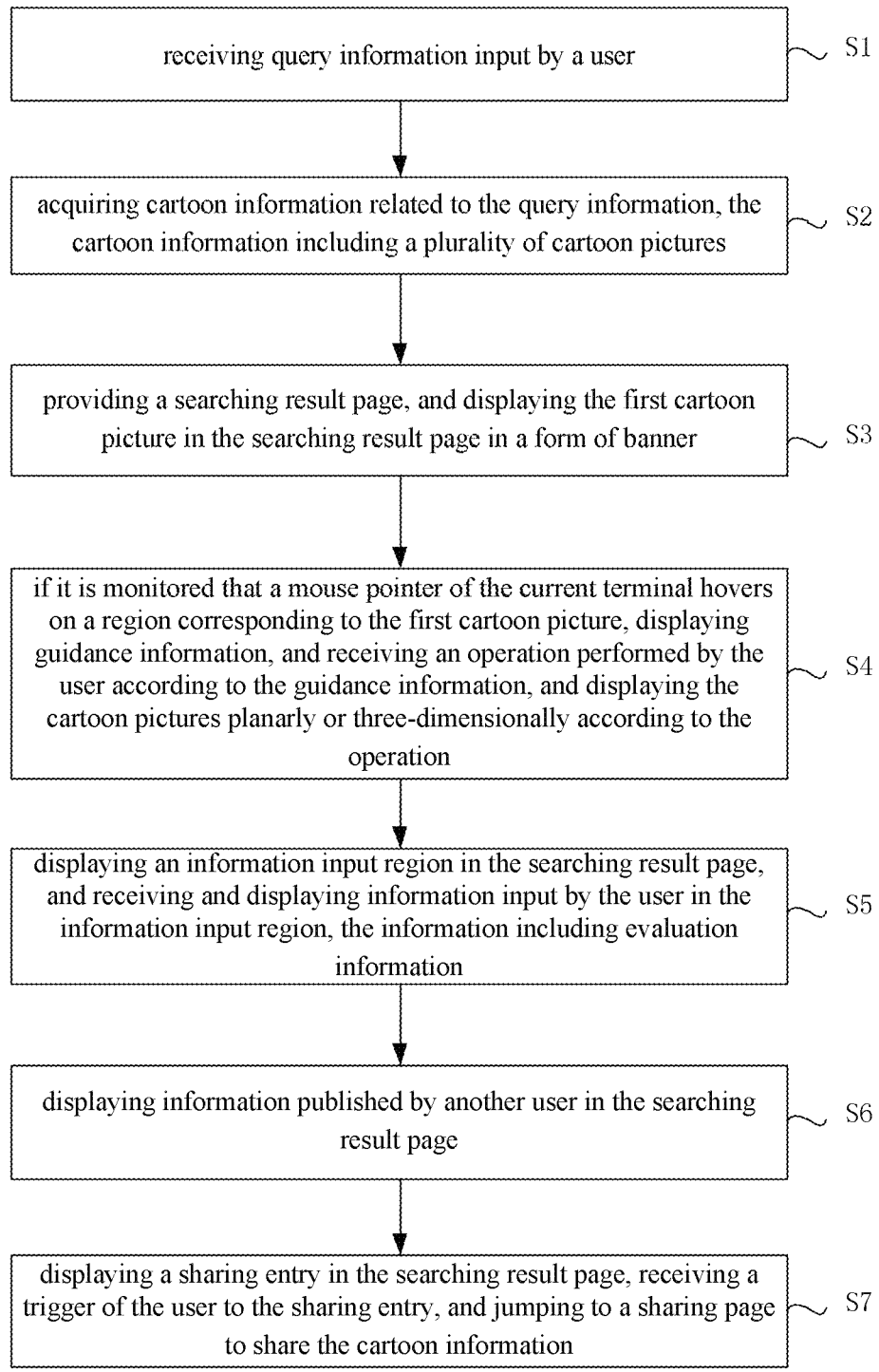
FIG. 8 is a flow chart showing a method for searching a cartoon according to yet another embodiment of the present disclosure.

Further, in order to facilitate the user's continuous sharing and spreading the cartoon story, as shown in FIG. 8, this method may also include followings.

In S7, a sharing entry is displayed in the searching result page, and a trigger of the user to the sharing entry is received and a sharing page is jumped to, for sharing the cartoon information.

Figure 9:
FIG. 9 is a schematic diagram showing a sharing page according to an embodiment of the present disclosure.

Specifically, it may be seen from FIGS. 2, 4, 6 and 7 that, logos such as "Sina Weibo", "QQ space" are displayed in the searching result page, and the user may click this logo to jump to the sharing page of "Sina Weibo" or "QQ space". As shown in FIG. 9, when the user clicks the "share" button of this page, the content in the resulting result page is shared to the social network such as "Weibo" and the like, thereby spreading spontaneously.

It should to be noted that, S7 may be executed after S6 or after S4, and FIG. 8 only shows an example.

In addition, in the embodiment of the present disclosure, the number of times of browsing the cartoon information may be recorded and counted, and the number of times of browsing is displayed in real time in the searching result page. Specifically, in FIGS. 2, 4, 6 and 7, a message "xx people have seen" may be shown, i.e. the number of people who have seen the cartoons is shown.

With the above method for searching a cartoon, by receiving the query information input by the user, and acquiring the cartoon information related to the query information and displaying the cartoon information in the searching result page in the preset form, the user may browse relevant cartoons through searching without needing to search and browse on the social network or click the natural result to enter a website for browsing, thereby better satisfying the user's cartoon searching requirement.

Figure 10:
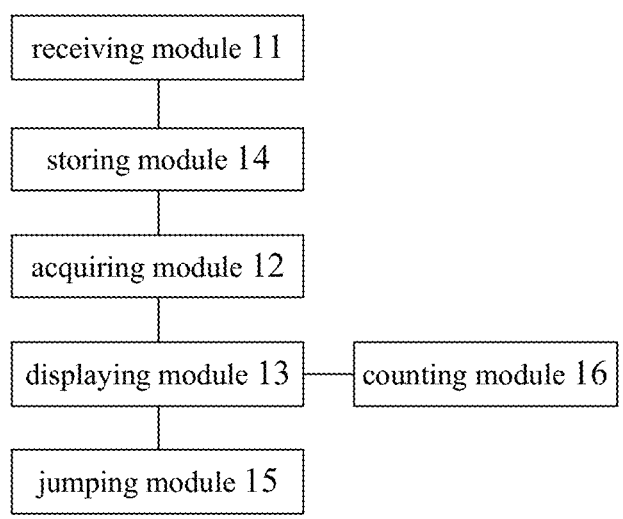
FIG. 10 is a block diagram showing an apparatus for searching a cartoon according to an embodiment of the present disclosure.

FIG. 10 is a block diagram showing an apparatus for searching a cartoon according to an embodiment of the present disclosure.

As shown in FIG. 10, the apparatus includes a receiving module 11, an acquiring module 12 and a displaying module 13.

The receiving module 11 is configured to receive query information input by a user; the acquiring module 12 is configured to acquire cartoon information related to the query information; and the displaying module 13 is configured to provide a searching result page, and to display the cartoon information in the searching result page in a preset form.

In the embodiment, when the user wants to acquire some information, he may input the query information in a search box. For example, when the user expects to get cartoon stories of Liu Shishi (a Chinese actress), he may input the query information of "Liu Shishi cartoon book" in the search box.

In addition, the apparatus further includes: a storing module 14. The storing module 14 is configured to store a correspondence between queries and related cartoon information before the acquiring module 12 acquires the cartoon information related to the query information. Specifically, the acquiring module 12 is configured to: determine whether the query information satisfies a preset condition, and if the query information satisfies the preset condition, extract a current query from the query information, and acquire cartoon information related to the current query according to the current query and the pre-stored correspondence between queries and related cartoon information.

In the embodiment, the displaying module 13 may display the cartoon information in the searching result page in a form of banner. The banner here is relative to the column in the related art. The column refers to that a light gray vertical bar is used as a separation to divide the searching result displaying region into a left region and a right region. The banner eliminates this kind of separation, such that a width of the displaying region is same as a width of a browser page of a current terminal. This displaying form is more intense, and may attract the attention of the user.

In addition, the above cartoon information includes a plurality of cartoon pictures and the displaying module 13 may display the first cartoon picture in the searching result page in the form of the banner. In addition, in order to facilitate the user to clearly know the main body corresponding to the current cartoon story, the acquiring module 12 is further configured to acquire head portrait information related to the query information. For example, the head portrait of Liu Shishi is acquired, and the head portrait of Liu Shishi and her cartoon picture may be displayed in the form of the banner, as show in FIG. 2. Then, the displaying module 13 displays the first cartoon picture and the head portrait information in the searching result page in the form of the banner.

In addition, as shown in FIG. 3, in order to allow the user to browse the above cartoon, the displaying module 13 is further configured to: if it is monitored that a mouse pointer of the current terminal hovers on a region corresponding to the first cartoon picture after the first cartoon picture is displayed, display guidance information, and receive an operation performed by the user according to the guidance information, and display the cartoon pictures planarly or three-dimensionally according to the operation; or receive a triggering operation of the user on the first cartoon picture and display the cartoon pictures planarly or three-dimensionally according to the triggering operation.

Specifically, when the user puts the mouse within the region of the first cartoon picture, an arrow to the right may be formed automatically in this region, so as to guide the user to click and browse downwards. When the user clicks on the arrow to the right, he may browse the cartoon pictures downwards. The animation effect when browsing may be the advanced 3D page turning effect, as shown in FIG. 4. Different from the general planar page turning effect, the 3D page turning effect is three-dimensional and has dimensional feeling and is close to page turning of real life.

Further, in order to make it convenient for the user to input reading experience and publish comments during the reading, the above displaying module 13 may be further configured to: display an information input region in the searching result page when the above cartoon pictures are displayed planarly or three-dimensionally, and receive and display information input by the user in the information input region, the information including evaluation information; and/or display information published by another user in the searching result page. As shown in FIG. 6, during the reading, the user may input reading experience and publish comments in the information input region under the cartoon, such as a dialog box, and the comment or experience may be displayed in the cartoon picture region timely, meanwhile other people's comments also may be displayed in this region. As shown in FIG. 7, the user may see and respond to other people's comments, thereby meeting needs of communicating with people and sharing reading experience.

Further, in order to facilitate the user's continuous sharing and spreading the cartoon story, the apparatus may further include a jumping module 15. The jumping module 15 is configured to receive a trigger of the user to the sharing entry when the displaying nodule 13 displays a sharing entry in the searching result page, and to jump to a sharing page, for sharing the cartoon information. Specifically, it may be seen from FIGS. 2, 4, 6 and 7 that, logos such as "Sina Weibo", "QQ space" are displayed in the searching result page, and the user may click the logo to jump to the sharing page of "Sina Weibo" or "QQ space". As shown in FIG. 9, when the user clicks the "share" button of this page, the content in the searching result page is shared to the social network such as "Weibo" and the like, thereby spreading spontaneously.

In addition, the apparatus may further include a counting module 16. The counting module 16 is configured to record and count the number of times of browsing the cartoon information, and to display the number of times of browsing in real time in the searching result page via the displaying module 13. Specifically, in FIGS. 2, 4, 6 and 7, a message "xx people have seen" may be shown, i.e. the number of people who have seen the cartoons is shown.

With the above apparatus for searching a cartoon, by receiving the query information input by the user via the receiving module, and acquiring the cartoon information related to the query information via the acquiring module and displaying the cartoon information in the searching result page in the preset form via the displaying module, the user may browse relevant cartoons through searching without needing to search and browse on the social network or click the natural result to enter a website for browsing, thereby better satisfying the user's cartoon searching requirement.

In order to achieve above objectives, embodiments of the present disclosure also provide a storage medium having stored therein applications configured to perform the method for searching a cartoon according to any embodiment of the present disclosure.

In order to achieve above objectives, embodiments of the present disclosure also provide a search engine. The search engine includes: one or more processors; a memory; one or more modules stored in the memory, and executed by the one or more processors to perform following acts:

S1', receiving query information input by a user;

S2', acquiring cartoon information related to the query information; and

S3', providing a searching result page, and displaying the cartoon information in the searching result page in a preset form.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In the description of the present disclosure, it should be understood that, terms such as "first" and "second" are used herein for purposes of description and are not intended to indicate or imply relative importance or significance. Thus, the feature defined with "first" or "second" may indicate or imply including at least one the feature In addition, in the description of the present disclosure, the term "a plurality" of means at least two, for example, two or three, unless explicitly limited.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The computer readable storage medium may be, but is not limited to, read-only memories, magnetic disks, or optical disks. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for searching a cartoon, comprising:
    S1, receiving query information input by a user;
    S2, acquiring cartoon information related to the query information; and
    S3, providing a searching result page, and displaying the cartoon information in the searching result page in a preset form;
    wherein the cartoon information comprises a cartoon story of a plurality of cartoon pictures viewable sequentially within the searching result page;
    wherein S2 further comprises acquiring head portrait information related to the query information;
    wherein S3 comprises displaying a first cartoon picture and the head portrait information in the searching result page in a form of banner, wherein the banner refers to that a width of a displaying region of the cartoon information and the head portrait information is same as a page width of a browser of a current terminal; and
    wherein the head portrait information corresponds to a head portrait of a real person portrayed in each of the plurality of cartoon pictures;
    wherein S3 further comprises displaying each of the plurality of cartoon pictures sequentially in place of the first cartoon picture with the head portrait information.

2. The method according to claim 1, before S2, further comprising:
    storing a correspondence between queries and related cartoon information.

3. The method according to claim 2, wherein S2 comprises:
    determining whether the query information satisfies a preset condition;
    if the query information satisfies the preset condition, extracting a current query from the query information, and acquiring cartoon information related to the current query according to the current query and the pre-stored correspondence between queries and related cartoon information.

4. The method according to claim 1, after S3, further comprising:
    if it is monitored that a mouse pointer of the current terminal hovers on a region corresponding to the first cartoon picture, displaying guidance information and receiving an operation performed by the user according to the guidance information, and displaying the cartoon pictures planarly or three-dimensionally according to the operation; or
    receiving a triggering operation of the user on the first cartoon picture and displaying the cartoon pictures planarly or three-dimensionally according to the triggering operation.

5. The method according to claim 4, further comprising:
    displaying an information input region in the searching result page, and receiving and displaying information input by the user in the information input region, the information comprising evaluation information; and/or
    displaying information published by another user in the searching result page.

6. The method according to claim 1, further comprising:
    displaying a sharing entry in the searching result page, receiving a trigger of the user to the sharing entry, and jumping to a sharing page to share the cartoon information.

7. The method according to claim 1, further comprising:
    recording and counting the number of times of browsing the cartoon information, and displaying the number of times of browsing in real time in the search result page.

8. The method according to claim 1, wherein the query information comprises a name of the real person portrayed in the cartoon information.

9. An apparatus for searching a cartoon, comprising:
    one or more processors;
    a memory;
    one or more modules stored in the memory, and executed by the one or more processors, the one or more modules comprising:
        a receiving module, configured to receive query information input by a user;
        an acquiring module, configured to acquire cartoon information related to the query information; and
        a displaying module, configured to provide a searching result page, and to display the cartoon information in the searching result page in a preset form;
    wherein the cartoon information comprises a cartoon story of a plurality of cartoon pictures viewable sequentially within the searching result page;
    wherein the acquiring module is further configured to acquire head portrait information related to the query information; and
    wherein the displaying module is configured to:
        display a first cartoon picture and the head portrait information in the searching result page in a form of banner, wherein the banner refers to that a width of a displaying region of the cartoon information and the head portrait information is same as a page width of a browser of a current terminal; and
    wherein the head portrait information corresponds to a head portrait of a real person portrayed in each of the plurality of cartoon pictures;
    wherein the displaying module is further configured to display each of the plurality of cartoon pictures sequentially in place of the first cartoon picture with the head portrait information.

10. The apparatus according to claim 9, wherein the one or more modules further comprises:
    a storing module, configured to store a correspondence between queries and related cartoon information before the acquiring module acquires the cartoon information related to the query information.

11. The apparatus according to claim 10, wherein the acquiring module is configured to:
    determine whether the query information satisfies a preset condition, and if the query information satisfies the preset condition, extract a current query from the query information, and acquire cartoon information related to the current query according to the current query and the pre-stored correspondence between queries and related cartoon information.

12. The apparatus according to claim 9, wherein the displaying module is further configured to:

if it is monitored that a mouse pointer of the current terminal hovers on a region corresponding to the first cartoon picture after the first cartoon picture is displayed, display guidance information and receive an operation performed by the user according to the guidance information, and display the cartoon pictures planarly or three-dimensionally according to the operation; or receive a triggering operation of the user on the first cartoon picture and display the cartoon pictures planarly or three-dimensionally according to the triggering operation.

13. The apparatus according to claim 12, wherein the displaying module is further configured to:

display an information input region in the searching result page, and receive and display information input by the user in the information input region when the cartoon pictures are displayed planarly or three-dimensionally, the information comprising evaluation information; and/or display information published by another user in the searching result page.

14. The apparatus according to claim 9, wherein the one or more modules further comprises:

a jumping module, configured to receive a trigger of the user to a sharing entry when the displaying module displays the sharing entry in the searching result page, and to jump to a sharing page, for sharing the cartoon information.

15. The apparatus according to claim 9, wherein the one or more modules further comprises:

a counting module, configured to record and count the number of times of browsing the cartoon information, and to display the number of times of browsing in real time in the searching result page via the displaying module.

16. The apparatus according to claim 9, wherein the query information comprises a name of the real person portrayed in the cartoon information.

17. A non-transitory storage medium having stored therein applications configured to perform a method for searching a cartoon, comprising:

S1, receiving query information input by a user;

S2, acquiring cartoon information related to the query information; and

S3, providing a searching result page, and displaying the cartoon information in the searching result page in a preset form;

wherein the cartoon information comprises a cartoon story of a plurality of cartoon pictures viewable sequentially within the searching result page;

wherein S2 further comprises acquiring head portrait information related to the query information;

wherein S3 comprises displaying a first cartoon picture and the head portrait information in the searching result page in a form of banner, wherein the banner refers to that a width of a displaying region of the cartoon information and the head portrait information is same as a page width of a browser of a current terminal; and wherein the head portrait information corresponds to a head portrait of a real person portrayed in each of the plurality of cartoon pictures;

wherein S3 further comprises displaying each of the plurality of cartoon pictures sequentially in place of the first cartoon picture with the head portrait information.

\* \* \* \* \*